US012172918B2

(12) United States Patent
Jiang et al.

(10) Patent No.: US 12,172,918 B2
(45) Date of Patent: Dec. 24, 2024

(54) DOMESTIC SEWAGE TREATMENT SYSTEM

(71) Applicants: SICHUAN UNIVERSITY, Chengdu (CN); EAST CHINA UNIVERSITY OF SCIENCE AND TECHNOLOGY, Shanghai (CN)

(72) Inventors: Xia Jiang, Chengdu (CN); Fengli Gan, Chengdu (CN); Yi Liu, Shanghai (CN); Yuxiao Sun, Shanghai (CN); Hualin Wang, Shanghai (CN); Yafang Han, Shanghai (CN)

(73) Assignees: SICHUAN UNIVERSITY, Chengdu (CN); EAST CHINA UNIVERSITY OF SCIENCE AND TECHNOLOGY, Shanghai (CN)

( * ) Notice: Subject to any disclaimer, the term of this patent is extended or adjusted under 35 U.S.C. 154(b) by 367 days.

(21) Appl. No.: 17/627,461

(22) PCT Filed: Aug. 19, 2020

(86) PCT No.: PCT/CN2020/110059
§ 371 (c)(1),
(2) Date: Jan. 14, 2022

(87) PCT Pub. No.: WO2021/032127
PCT Pub. Date: Feb. 25, 2021

(65) Prior Publication Data
US 2022/0259087 A1     Aug. 18, 2022

(30) Foreign Application Priority Data
Aug. 20, 2019    (CN) .......................... 201910767759.5

(51) Int. Cl.
*C02F 9/00*    (2023.01)
*C02F 1/00*    (2023.01)
(Continued)

(52) U.S. Cl.
CPC ............... *C02F 9/00* (2013.01); *C02F 1/001* (2013.01); *C02F 1/004* (2013.01);
(Continued)

(58) Field of Classification Search
CPC .. C02F 9/00; C02F 1/001; C02F 1/004; C02F 1/28; C02F 1/281; C02F 1/283;
(Continued)

(56) References Cited

U.S. PATENT DOCUMENTS

2013/0126442 A1*  5/2013  Bakas ..................... C02F 1/725
                                                    210/758

FOREIGN PATENT DOCUMENTS

CN          202744428 U         2/2013
CN          103723790 A         4/2014
(Continued)

OTHER PUBLICATIONS

Machine-generated English translation of KR 101302269, generated on Apr. 18, 2024.*
(Continued)

*Primary Examiner* — Fred Prince
(74) *Attorney, Agent, or Firm* — Caesar Rivise, PC (57) ABSTRACT

A treatment system for domestic wastewater, relating to the technical field of wastewater treatment. The treatment system comprises a primary treatment system, a secondary treatment system, and a sludge treatment system; the secondary treatment system comprises a biochemical tank (21) and a sedimentation tank (22) that are sequentially connected; the biochemical tank (21) is connected to the primary treatment system; the secondary treatment system further comprises a second cylcone separator (23) and a power pump (24); one end of the power pump (24) is connected to a sludge outlet of the sedimentation tank (22) by means of a pipeline, and the other end of the power pump
(Continued)

(24) is connected to a second feed pipe (232) of the second cylcone separator (23); a second underflow port (233) is connected to the biochemical tank (21) by means of the pipeline; a second overflow port (234) is connected to the sludge treatment system by means of the pipeline. After active sludge is treated by the second cylcone separator (23), the activity of the active sludge is increased by at least 15%, thereby improving the utilization rate of a resource, reducing the cost of an overall treatment system, also improving degradation efficiency in the biochemical tank, and facilitating popularization.

4 Claims, 4 Drawing Sheets

(51) Int. Cl.
| | |
|---|---|
| *C02F 1/28* | (2023.01) |
| *C02F 1/38* | (2023.01) |
| *C02F 1/40* | (2023.01) |
| *C02F 1/44* | (2023.01) |
| *C02F 1/50* | (2023.01) |
| *C02F 1/52* | (2023.01) |
| *C02F 3/00* | (2023.01) |
| *C02F 3/34* | (2023.01) |
| *C02F 11/12* | (2019.01) |
| *C02F 11/13* | (2019.01) |
| *C02F 11/123* | (2019.01) |
| *C02F 11/127* | (2019.01) |
| *C02F 101/10* | (2006.01) |
| *C02F 101/30* | (2006.01) |
| *C02F 101/32* | (2006.01) |

(52) U.S. Cl.
CPC .......... *C02F 2001/007* (2013.01); *C02F 1/28* (2013.01); *C02F 1/281* (2013.01); *C02F 1/283* (2013.01); *C02F 1/38* (2013.01); *C02F 1/40* (2013.01); *C02F 1/442* (2013.01); *C02F 1/50* (2013.01); *C02F 1/5245* (2013.01); *C02F 3/00* (2013.01); *C02F 3/34* (2013.01); *C02F 11/123* (2013.01); *C02F 11/127* (2013.01); *C02F 11/13* (2019.01); *C02F 2101/10* (2013.01); *C02F 2101/30* (2013.01); *C02F 2101/32* (2013.01); *C02F 2201/002* (2013.01); *C02F 2201/005* (2013.01); *C02F 2201/007* (2013.01); *C02F 2301/08* (2013.01)

(58) Field of Classification Search
CPC .... C02F 1/38; C02F 1/40; C02F 1/442; C02F 1/50; C02F 1/5245; C02F 3/00; C02F 3/34; C02F 11/123; C02F 11/127; C02F 11/13; C02F 2001/007; C02F 2101/10; C02F 2101/30; C02F 2101/32; C02F 2201/002; C02F 2201/005; C02F 2201/007
USPC ................ 210/181, 182, 252, 259, 260, 261
See application file for complete search history.

(56) References Cited

FOREIGN PATENT DOCUMENTS

| | | | |
|---|---|---|---|
| CN | 203820613 | U | 9/2014 |
| CN | 105384305 | A | 3/2016 |
| CN | 107055933 | A | 8/2017 |
| CN | 107382654 | A | 11/2017 |
| CN | 108046516 | A | 5/2018 |
| CN | 208055096 | U | 11/2018 |
| CN | 110510809 | A | 11/2019 |
| CN | 110550843 | A | 12/2019 |
| CN | 110550844 | A | 12/2019 |
| CN | 110550845 | A | 12/2019 |
| KR | 20120084227 | A | 7/2012 |
| KR | 101302269 | B1 * | 9/2013 |

OTHER PUBLICATIONS

English Abstract for CN 202744428 U (2013).
English Abstract for CN 103723790 A (2014).
English Abstract for CN 203820613 U (2014).
English Abstract for CN 105384305 A (2016).
English Abstract for CN 107055933 A (2017).
English Abstract for CN 107382654 A (2017).
English Abstract for CN 108046516 A (2018).
English Abstract for CN 208055096 U (2018).
English Abstract for CN 110510809 A (2019).
English Abstract for CN 110550843 A (2019).
English Abstract for CN 110550844 A (2019).
English Abstract for CN 110550845 A (2019).
English Abstract for KR 20120084227 A (2012).
International Search Report for PCT/CN2020/110059 (Nov. 20, 2020).

\* cited by examiner

DOMESTIC SEWAGE TREATMENT SYSTEM

CROSS-REFERENCE TO RELATED APPLICATIONS

This application is a U.S. National Phase Application of PCT/CN2020/110059, filed Aug. 19, 2020, which claims priority to CN 201910767759.5, filed Aug. 20, 2019, the contents of which applications are incorporated herein by reference in their entireties for all purposes.

FIELD OF THE INVENTION

The present invention relates to the technical field of sewage treatment, in particular to a domestic sewage treatment system.

BACKGROUND OF THE INVENTION

The urban pipe network system collects urban domestic sewage and transports it to the sewage treatment plant for treatment. The existing domestic sewage treatment system used in sewage treatment plants comprises a primary treatment system, a secondary treatment system and an advanced treatment system connected in sequence. The primary treatment system comprises a coarse screen assembly, a fine screen assembly and an aeration grit chamber connected in sequence; the secondary treatment system comprises a biochemical tank and a clarifier connected in sequence, with the biochemical tank connected to the aeration grit chamber and the clarifier connected to the advanced treatment system; and the advanced treatment system comprises a clarifier and a disinfection tank connected in sequence. The specific treatment process is as follows: domestic sewage first passes through the coarse screen assembly and the fine screen assembly to remove coarse floating matters and suspended solids in the sewage, and then the sewage flows enters the aeration grit chamber where the sewage advances in the form of spiral flow to further remove sand particles and some organic pollutants, with the effluent entering the biochemical tank for secondary treatment. The biochemical tank contains a large number of microorganisms that can decompose and digest the degradable organic matters in the sewage, and the microorganisms can grow and aggregate to form activated sludge. The treated sewage then enters the clarifier again to separate the sludge from water, indicating the completion of the primary and secondary sewage treatment. The sewage subjected to the primary treatment and secondary treatment still contains some micro suspended solids, colloids, microorganisms, viruses, heavy metals and substances such as nitrogen and phosphorus that lead to eutrophication, and thus shall be subjected to the advanced treatment to meet the sewage discharge standards. Then the sewage from the secondary treatment system enters the clarifier and the disinfection tank in sequence. The sewage that has been disinfected and sterilized in the disinfection tank can be discharged into natural water or reused, while the excess sludge in the clarifier directly enters the sludge treatment system for treatment and then is discharged.

The surface of microorganisms of excess sludge in the clarifier is coated with a lot of microbial metabolites mainly including polysaccharide, protein, lipids, DNA and humic acid, which are aggregated on the surface of activated sludge microorganisms to form extracellular polymers. The extracellular polymers wrap microorganisms to block the mass transfer between microorganisms and water, which affects the degradation of organic matters by microorganisms and thus reduces the activity of activated sludge. The existing method of directly treating excess sludge in the clarifier by the sludge treatment system and then discharging will result in loss of part of activated sludge with high activity, thereby causing the waste of resources, low utilization rate of resources, and increase the cost of domestic sewage treatment.

SUMMARY OF THE INVENTION

The present invention is to provide a domestic sewage treatment system with simple structure, low cost and high utilization rate of resources to solve the technical problem existing in the current sewage treatment system.

The technical solution for solving the technical problem provided by the present invention is a domestic sewage treatment system, comprising a primary treatment system, a secondary treatment system and a sludge treatment system, wherein the primary treatment system comprises a coarse screen assembly and a fine screen assembly connected in sequence, the secondary treatment system comprises a biochemical tank and a clarifier connected in sequence, and the biochemical tank is connected to the primary treatment system, The primary treatment system further comprises a first hydrocyclone intensified filtration, a collector, a shape coalescer and an oil storage tank, the fine screen assembly is connected to the first hydrocyclone intensified filtration, the first hydrocyclone intensified filtration is connected to the shape coalescer and the collector, and the oil storage tank is connected to the shape coalescer;

the secondary treatment system further comprises a second cyclone separator and a power pump, the second cyclone separator comprises a second body and a second feed pipe arranged at one side thereof, a second underflow port is arranged at one side of the second body, a second overflow port is arranged at the other side thereof, one end of the power pump is connected to a sludge outlet of the clarifier through a pipe, the other end thereof is connected to the second feed pipe of the second cyclone separator, the second underflow port is connected to the biochemical tank through a pipe, and the second overflow port is connected to the sludge treatment system through a pipe;

the domestic sewage treatment system further comprises an advanced treatment system, which is connected to the secondary treatment system and the sludge treatment system, the advanced treatment system comprises a second hydrocyclone intensified filtration with the same structure as the first hydrocyclone intensified filtration and a nanofiltration device, and both the clarifier and the nanofiltration device are connected to the second hydrocyclone intensified filtration;

the sludge treatment system comprises a sludge storage tank, a belt dehydrator, a hot gas generating device, a gas-liquid separator, and two first cyclone separators connected in series, the sludge storage tank is connected to the secondary treatment system and the belt dehydrator, the first cyclone separator comprises a first body and a first feed pipe vertically arranged at one side of the first body, a first underflow port is arranged at the bottom of the first body, a first overflow port is arranged at the top thereof, both the hot gas generating device and the belt dehydrator are connected to the first feed pipe of the first cyclone separator arranged first in line along the sludge flow direction, and first overflow ports are connected to the gas-liquid separator;

the sludge treatment system further comprises a separation column, the first underflow port of the first cyclone separator arranged first in line along the sludge flow direction is connected to the feed port of the separation column, and the discharge port of the separation column is connected to the first feed pipe of another first cyclone separator.

Further, the first hydrocyclone intensified filtration comprises a shell, a first water inlet, a first water outlet, a separation medium bed and a discharge distributor, wherein the first water inlet is arranged at the top of the shell, the first water outlet is arranged at the bottom thereof, the separation medium bed and the discharge distributor are arranged therein, and the separation medium bed is arranged on the discharge distributor.

Further, a first valve is arranged at the first water inlet, a second valve is arranged at the first water outlet, the first hydrocyclone intensified filtration further comprises a gas inlet, a cleaning water inlet and a cyclone three-phase separator, both the gas inlet and the cleaning water inlet are arranged at the bottom of the shell, a third valve is arranged at the gas inlet, a fourth valve is arranged at the cleaning water inlet, and the cyclone three-phase separator is arranged in the shell and positioned at the top thereof.

Further, the shape coalescer comprises a third body, with a second water inlet, a second water outlet and a purified oil outlet arranged thereon and with a fluid homogenizer, a coarse granulation module, a fast separation module and a deep separation module arranged therein in sequence.

The advantageous effects of the present invention are as follows: The secondary treatment system comprises a second cyclone separator and a power pump. The power pump transports the excess activated sludge in the clarifier to the second cyclone separator, and the activated sludge enters the second body from the second feed pipe and rotates at high speed in the second body. Extracellular polymers wrapped on the outer surface of sludge microorganisms under the action of high-speed rotating field, and the coupling action of rotation and self-revolution of continuous phase and dispersed phase in the second cyclone separator, part of extracellular polymers wrapped on the outer surface of sludge microorganisms falls off the outer surface of the activated sludge and is discharged from the second overflow port of the second cyclone separator due to its light weight, and the excess activated sludge flows back to the biochemical tank from the second underflow port of the second cyclone separator. Part of extracellular polymers wrapped on the outer surface of sludge microorganisms falls off, which improves the mass transfer between microorganisms in degradable sewage and water, strengthens the ability of microorganisms to degrade organic matters in sewage, and thus enhances the activity of the excess activated sludge in the clarifier. The test shows that the activity of activated sludge treated by the second cyclone separator is increased by at least 15%, thus improving the utilization rate of resources, reducing the cost of the whole treatment system, and increasing the degradation efficiency in the biochemical tank. Therefore, the domestic sewage treatment system is suitable for promotion and popularization.

Parts, positions and serial numbers in the drawings: coarse screen assembly 11, fine screen assembly 12, first hydrocyclone intensified filtration 13, shell 131, first water inlet 132, first water outlet 133, separation medium bed 134, discharge distributor 135, splitter plate, 1351, water caps 1352, gas inlet 136, cleaning water inlet 137, cyclone three-phase separator 138, fourth body 1381, feed port 1382, drain outlet 1383, air outlet 1384, collector 14, shape coalescer 15, third body 151, second water inlet 152, second water outlet 153, purified oil outlet 154, fluid homogenizer 155, coarse granulation module 156, fast separation module 157, deep separation module 158, oil storage tank 16, biochemical tank 21, clarifier 22, second cyclone separator 23, second body 231, second feed pipe 232, second underflow port 233, second overflow port 234, power pump 24, second hydrocyclone intensified filtration 31, nanofiltration device 32, sludge storage tank 41, belt dehydrator 42, hot gas generating device 43, first cyclone separator 44, first body 441, first feed pipe 442, first underflow port 443, first overflow port 444, gas-liquid separator 45, separation column 46.

DETAILED DESCRIPTION OF THE PREFERRED EMBODIMENTS

The present invention will now be further explained with concerning the drawings.

Figure 1:
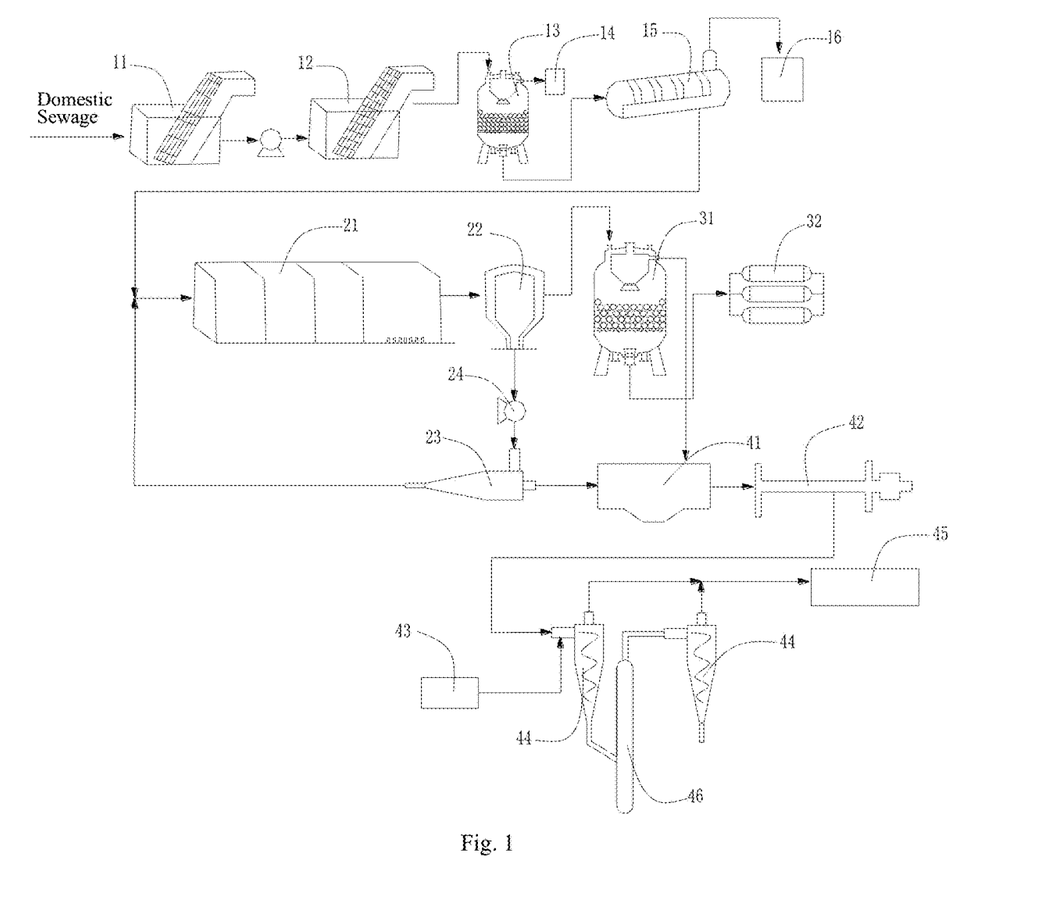
FIG. 1 is a structural diagram of the flow of the domestic sewage treatment system.
Figure 6:
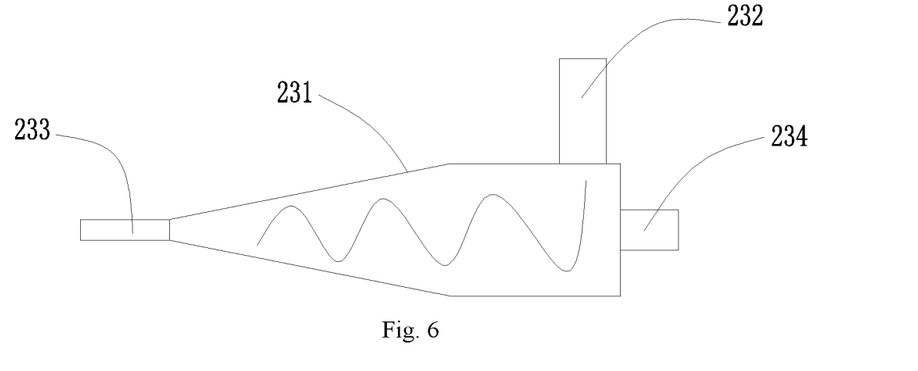
FIG. 6 is a structural diagram of the second cyclone separator.

As shown in FIG. 1 and FIG. 6, a domestic sewage treatment system comprises a primary treatment system, a secondary treatment system and a sludge treatment system. The secondary treatment system comprises a biochemical tank 21 and a clarifier 22 connected in sequence, and the biochemical tank 21 is connected to the primary treatment system. The secondary treatment system further comprises a second cyclone separator 23 and a power pump 24; the second cyclone separator 23 comprises a second body 231 and a second feed pipe 232 arranged vertically at one side thereof, a second underflow port 233 is arranged at one side of the second body 231, a second overflow port 234 is arranged at the other side thereof; one end of the power pump 24 is connected to a sludge outlet of the clarifier 22 through a pipe, the other end thereof is connected to the second feed pipe 232 of the second cyclone separator 23, the second underflow port 233 is connected to the biochemical tank 21 through a pipe, and the second overflow port 234 is connected to the sludge treatment system through a pipe.

During sewage treatment, the power pump 24 transports the excess activated sludge in the clarifier 22 to the second cyclone separator 23, and the activated sludge enters the second body 231 from the second feed pipe 232 and rotates at high speed in the second body 231. Under the action of high-speed rotating field and the coupling action of rotation and self-revolution of continuous phase and dispersed phase, part of extracellular polymers wrapped on the outer surface of sludge microorganisms falls off the outer surface of the activated sludge and is discharged from the second overflow port 234 of the second cyclone separator 23 due to its light weight, and the excess activated sludge flows back to the biochemical tank 21 from the second underflow port 233 of the second cyclone separator 23. Part of extracellular polymers wrapped on the outer surface of sludge microorganisms falls off, which improves the mass transfer between microorganisms in degradable sewage and water, strengthens the ability of microorganisms to degrade organic matters in sewage is improved, and thus enhances the activity of the excess activated sludge in the clarifier 22. The test shows that the activity of activated sludge treated by the cyclone separator is increased by at least 15%. The second cyclone separator 23 can not only improve the activity of activated sludge, but also optimize the cyclone intensity by adjusting the split ratio of the second cyclone separator 23 to sort the sludge by activity; that is, the activated sludge with high activity is separated out, the sludge with low activity is separated out and processed in the sludge treatment system, thus further improving the activity of activated sludge flowing back into the biochemical tank 21 and increasing the degradation efficiency in the biochemical tank 21. It can be seen that the method of the present invention avoids the direct waste of the excess activated sludge in the clarifier 22, improves the utilization rate of resources, reduces the cost of the whole secondary treatment system, and improves the degradation efficiency in the biochemical tank. Then a lot of tests and practice show that when the second body 231 is arranged horizontally, the second feed pipe 232 is arranged vertically on side of the second body 231, the second underflow port 233 is arranged on the left side of the second body 231, and the second overflow port 234 is arranged on the right side thereof, in this way, the activity of activated sludge is increased by at least 20% after the excess activated sludge in the clarifier 22 is treated by the second hydrocyclone separator 23.

The preferred mode of the primary treatment system of the invention is: as shown again in FIG. 1, a primary treatment system comprises a coarse screen assembly 11 and a fine screen assembly 12 connected in sequence, and further comprises a first hydrocyclone intensified filtration 13, a collector 14, a shape coalescer 15 and an oil storage tank 16. The fine screen assembly 12 is connected to first hydrocyclone intensified filtration 13, the first hydrocyclone intensified filtration 13 is connected to the shape coalescer 15 and the collector 14, and the oil storage tank 16 is connected to the shape coalescer 15. During the domestic sewage treatment, the domestic sewage passes through the coarse screen assembly 11, the fine screen assembly 12, the first hydrocyclone intensified filtration 13 and the shaped coalescer 15 in sequence for corresponding treatment. To enable the sewage to pass through the coarse screen assembly 11, the fine screen assembly 12, the first hydrocyclone intensified filtration 13 and the shaped coalescer 15 in sequence, material conveying devices are provided between the coarse screen assembly 11 and the fine screen assembly 12, between the fine screen assembly 12 and the first hydrocyclone intensified filtration 13, and between the first hydrocyclone intensified filtration 13 and the shaped coalescer 15, respectively. The specific treatment process of the primary treatment system is as follows: during the domestic sewage treatment, the sewage treated by the fine screen assembly 12 enters the first hydrocyclone intensified filtration 13, arranged therein with a separation medium bed 134 for removing sand particles, suspended solids and some organic matters in the sewage. The removed sand particles, suspended solids and organic matters are transported to the collector 14 for storage through the conveying device, and enter the shape coalescer 15 after meeting the treatment requirements. The emulsified oil is demulsified, aggregated and separated in the shape coalescer 15 to remove the emulsified oil in the sewage, and purified oil is then stored in the oil storage tank 16 through the conveying device. Then, after the emulsified oil in the sewage meets the treatment requirements, the primary treatment of domestic sewage is completed. It can be seen that according to the present invention, sand particles and emulsified oil are removed by the first hydrocyclone intensified filtration 13 and the shape coalescer 15, which significantly reduces the floor space and cost of the primary treatment system. The first hydrocyclone intensified filtration 13 is also easy to operate and use, has a simple structure, and does not produce a large amount of malodorous gas in the treatment process. At the same time, the removal of a large amount of emulsified oil reduces the impact on the subsequent sewage treatment and improves the sewage treatment effect.

Figure 2:
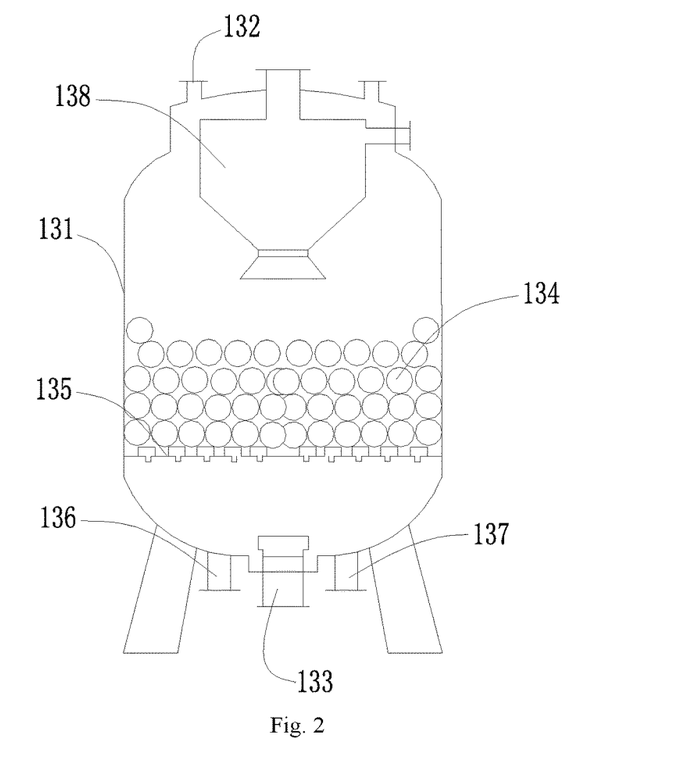
FIG. 2 is a structural diagram of the first hydrocyclone intensified filtration.

The first hydrocyclone intensified filtration 13 serves to remove sand particles, suspended solids and some organic matters from the sewage treated by the fine screen assembly 12 so that sand particles in the sewage can meet the treatment requirements. The preferred mode of the first hydrocyclone intensified filtration 13 of the invention is: as shown in FIG. 2, the first hydrocyclone intensified filtration 13 comprises a shell 131, a first water inlet 132, a first water outlet 133, a separation medium bed 134 and a discharge distributor 135. The first water inlet 132 is arranged at the top of the shell 131, the first water outlet 133 is arranged at the bottom thereof, and both the separation medium bed 134 and the discharge distributor 135 are arranged therein, and the separation medium bed 134 is arranged on the discharge distributor 135 and is made of granular separation media, preferably spherical media, with the particle size of 0.1-0.2 mm. The separation medium bed 134 is composed of one or more granular separation media, which are organic or inorganic materials strongly adsorptive to pollutants, especially sand particles, suspended solids and some organic matters in the sewage, such as quartz sand, anthracite and activated carbon. The sewage treated by the fine screen assembly 12 enters the shell 131 from the first water inlet 132, passes through the separation medium bed 134 and the discharge distributor 135 sequentially, and is finally discharged from the first water outlet 133. The separation medium bed 134 intercepts and adsorbs sand particles, suspended solids and some organic matters in the sewage to gradually reduce the sand particles, suspended solids and organic matters in the sewage until they meet the treatment requirements.

For convenience of installation and use, as shown again in FIG. 2, the discharge distributor 135 comprises a splitter plate 1351 and water caps 1352 arranged thereon, and the splitter plate 1351 is fixed horizontally in the shell 131; the sewage passes through the separation medium bed 134 and is then discharged through the water caps 1352.

Figure 3:
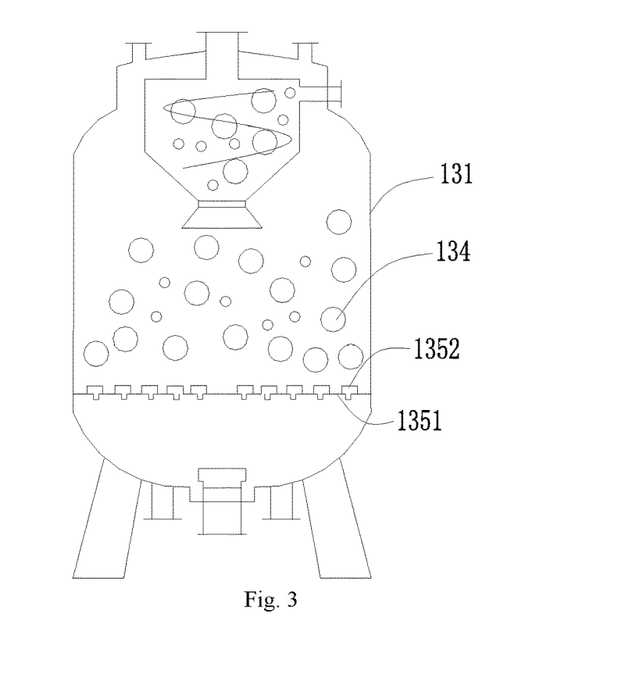
FIG. 3 is a schematic diagram of the first hydrocyclone intensified filtration in a cleaning state.
Figure 4:
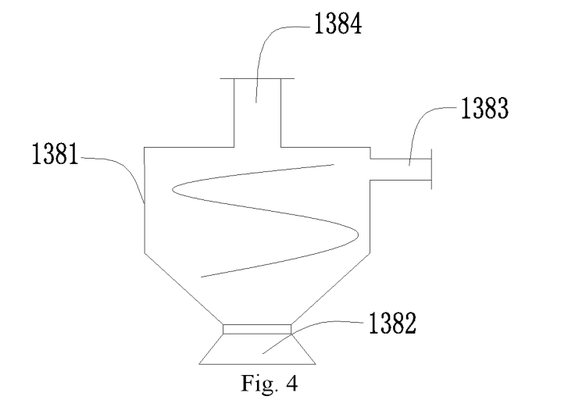
FIG. 4 is a structural diagram of the cyclone three-phase separator.

To reduce the cost of sewage treatment, enable the reuse of the separation media in the separation medium bed 134, and prolong the service time of the separation media, a first valve can be provided at the first water inlet 132 and a second valve can be provided at the first water outlet 133. The first hydrocyclone intensified filtration 13 is further provided with a gas inlet 136, a cleaning water inlet 137 and a cyclone three-phase separator 138. The gas inlet 136 and the cleaning water inlet 137 are arranged at the bottom of shell 131, a third valve is arranged at the gas inlet 136, a fourth valve is arranged at the cleaning water inlet 137, and the cyclone three-phase separator 138 is arranged in shell 131 and located at the top of shell 131. As shown in FIG. 4, the cyclone three-phase separator 138 comprises a fourth body 1381, a feed port 1382, a drain outlet 1383 and an air outlet 1384. The feed port 1382 is arranged at the bottom of the fourth body 1381, the air outlet 1384 is arranged at the top thereof, the drain outlet 1383 is arranged at one side of thereof, a fifth valve is arranged at the feed port 1382, a sixth valve is arranged at the drain outlet 1383, and a seventh valve is provided at the air outlet 1384. When the first hydrocyclone intensified filtration 13 is used for a period of time, a lot of pollutants will be adsorbed on the surface of the separation medium bed 134, and the separation media can be regenerated by backwashing the separation medium bed 134 to achieve the purpose of reusing the separation media. The specific backwashing steps are as follows: closing the first valve and the second valve, opening the third valve, the fourth valve, the fifth valve, the sixth valve and the seventh valve, introducing cleaning liquid at a certain pressure into the shell 131 via the cleaning water inlet 137, and introducing gas at a certain pressure into the shell 131 via the gas inlet 136, after the cleaning liquid and gas pass through the discharge distributor 135, the granular separation media will be rolled from bottom to top. As shown in FIG. 3, the pollutants adsorbed on the separation media are separated therefrom. The separated media and pollutants enter the fourth body 1381 of the cyclone three-phase separator 138 via the feed port 1382, and are completely separated from each other by particle rotation and revolution coupling enhancement in the fourth body 1381. The pollutants are discharged from the drain outlet 1383 into the sludge treatment system for treatment, gas is discharged from the air outlet 1384, and the separation media flow back to the discharge distributor 135 to form the separation medium bed 134 again. After the regeneration of the separated medium bed 134, the third valve, the fourth valve, the fifth valve, the sixth valve and, the seventh valve are closed, and the first valve and the second valve are opened, so that the primary treatment of the sewage is carried out. For convenience of use, the above valves are controlled by a controller.

Figure 5:
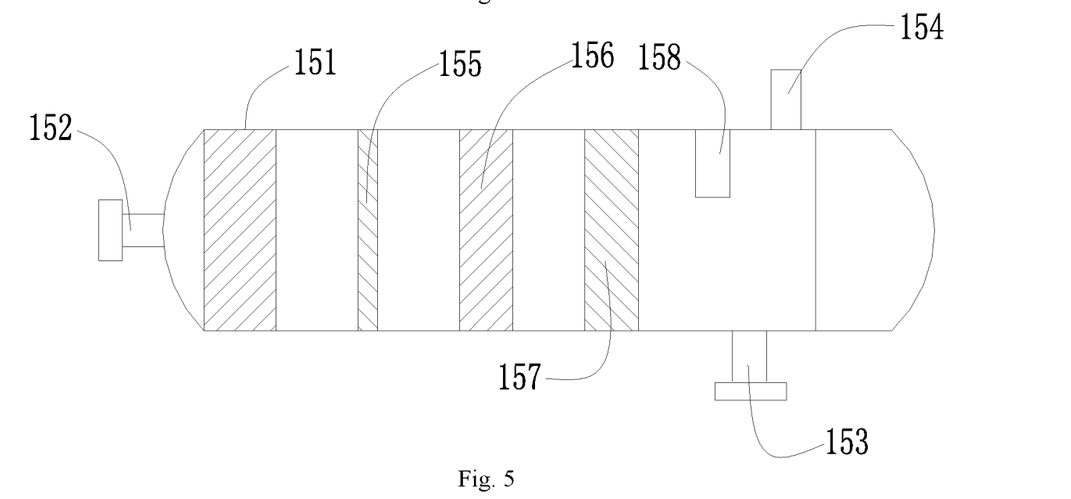
FIG. 5 is a structural diagram of the shape coalescer.

The shape coalescer 15 serves to remove the emulsified oil in the sewage to meet the treatment requirements. The preferred mode of the shape coalescer 15 of the invention is: as shown in FIG. 5, the shape coalescer 15 comprises a third body 151, with a second water inlet 152, a second water outlet 153 and a purified oil outlet 154 arranged thereon, and with a fluid homogenizer 155, a coarse granulation module 156, a fast separation module 157 and a deep separation module 158 arranged therein in sequence. During sewage treatment, the sewage enters the third body 151 through the second water inlet 152, with the volume and flow rate adjusted by the fluid homogenizer 155, and then passes through the coarse granulation module 156, the fast separation module 157 and the deep separation module 158 in sequence to achieve oil-water demulsification and separation. The separated emulsified oil is discharged through the purified oil outlet 154 and stored in the oil storage tank 16, and the sewage flows out through the second water outlet 153 for subsequent treatment.

The sewage treated by the primary treatment system and the secondary treatment system still needs to be treated before it can meet the standards for discharge to natural waters or reuse. Therefore, the domestic sewage treatment system of the present invention also comprises an advanced treatment system connected to the secondary treatment system and the sludge treatment system.

The existing advanced treatment system comprises a clarifier and a disinfection tank. The treatment method combining clarifier and disinfection tank is to add chemicals according to the water quality to achieve the purpose of removing pollutants. For example, coagulants, usually aluminum salt, are added to the clarifier, while disinfectants, usually liquid chlorine, sodium hypochlorite and chlorine dioxide, are added to the disinfection tank. The method of removing pollutants by chemicals is easily affected by the quality of sewage, has poor sewage treatment effect, and can increase the cost of water production if improperly regulated, and it occupies a large area and will also produce other adverse effects. The preferred mode of the advanced treatment system of the invention is: as shown again in FIG. 2, the advanced treatment system comprises a second hydrocyclone intensified filtration 31 and a nanofiltration device 32 connected thereto. The second hydrocyclone intensified filtration 31 is structurally the same as the first hydrocyclone intensified filtration 13, and the clarifier 22 is connected to the second hydrocyclone intensified filtration 31. During the domestic sewage treatment, the sewage treated by the clarifier 22 directly enters the second hydrocyclone intensified filtration 31, the separation medium bed in the second hydrocyclone intensified filtration 31 removes suspended solids and some dissolved organic matters in the sewage, and then the sewage passes through the nanofiltration device 32 to further remove suspended solids, colloids, organic matters and total nitrogen in the sewage until it meets the standards for discharge to natural waters or reuse. The separation medium bed is made of granular separation media, preferably spherical media, with the particle size of 0.1-0.2 mm. The separation medium bed is composed of one or more granular separation media, which are organic or inorganic materials strongly adsorptive to pollutants, especially strongly adsorptive to suspended solids and some dissolved organic matters in the sewage, and can be anthracite and activated carbon and so on. When the second hydrocyclone intensified filtration 31 is used after a certain period of operation, a lot of pollutants will be adsorbed on the surface of the separation media in the separation medium bed, and the separation media can be regenerated by backwashing the separation media bed to achieve the purpose of reusing the separation media and reduce the cost. It can be seen that the advanced sewage treatment can be completed only by use of the second hydrocyclone intensified filtration 31 and the nanofiltration device 32, without a need to build a clarifier and a disinfection tank, or add chemicals and disinfectants. Since the treatment effect is not easily affected by water quality and environmental conditions, the sewage treatment effect is improved. In addition, the advanced treatment system features in simple structure, small floor space, low cost, easy automation and high efficiency, and is thus suitable for promotion and popularization.

Figure 7:
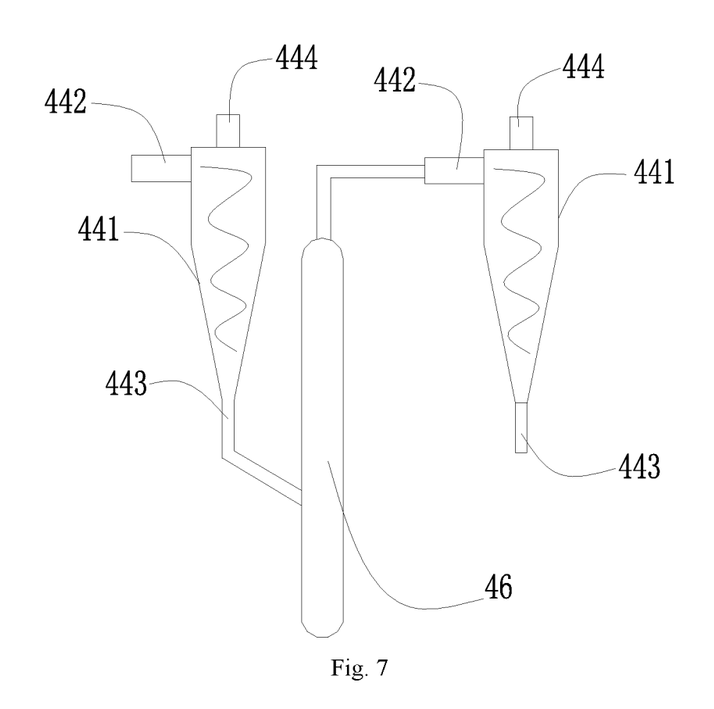
FIG. 7 is a structural diagram of the first cyclone separator and the separation column.

The preferred mode of the sludge treatment system of the invention is: as shown in FIG. 1 and FIG. 7, the sludge treatment system comprises a sludge storage tank 41, a belt dehydrator 42, a hot gas generating device 43, a gas-liquid separator 45, and several first cyclone separators 44 connected in series in sequence. The sludge storage tank 41 is connected to the secondary treatment system, the advanced treatment system and the belt dehydrator 42. The first cyclone separator 44 comprises a first body 441 and a first feed pipe 442 vertically arranged at one side thereof, a first underflow port 443 is arranged at the bottom of the first body 441 and a first overflow port 444 is arranged at the top thereof; the hot gas generating device 43 and the belt dehydrator 42 are connected to the first feed pipe 442 of the first cyclone separator 44 arranged first in line along the sludge flow direction, and all the first overflow ports 444 are connected to the gas-liquid separator 45.

Both the secondary treatment system and the advanced treatment system will produce a certain amount of sludge, which is transported to the sludge storage tank 41 and then to the belt dehydrator 42 by the material conveying device for preliminary treatment during sludge treatment. The belt dehydrator 42 can remove part of the water content in sludge, reduce the viscosity of sludge, reduce the interaction force between water and solid particles, and improve the dispersibility of sludge particulate. Then, the sludge preliminarily treated by the belt dehydrator 42 enters the first cyclone separator 44 arranged first in line through the material conveying device for treatment, and at the same time, the hot gas generating device 43 works to generate a hot gas medium that is introduced into the first cyclone separator 44 arranged first in line and is able to further reduce the viscosity of the sludge. The first cyclone separator 44 works to generate a high-speed rotating field in the first body 441 under the action of hot gas medium. Under the action of the high-speed rotating field, the sludge solid particulates generate high-speed rotation and revolution in the high-speed cyclone field, and the resulting centrifugal force overcomes the capillary resistance of adsorbed water among solid particles. During the first separation of solid particles from water in sludge, the water and gas medium removed from sludge enter the gas-liquid separator 45 through the first overflow port 444 at the top, and achieve gas-liquid separation in the gas-liquid separator 45; whereas, the sludge enters the second first cyclone separator 44 from the first underflow port 443 of the first cyclone separator 44, and passes through a plurality of first cyclone separators 44 connected in series in sequence, so that the solid particles in sludge are separated from water for many times to meet the requirement of water content of sludge during subsequent treatment; in contrast to the method of removing water from sludge by hot drying and hot evaporation, the sludge treatment system of the present invention has simple structure, relatively low energy consumption, and high dehydration efficiency per unit time, which can reduce the cost of the sludge treatment system. In addition, the system features in small floor space, simple equipment and easy operation, and is thus suitable for promotion and popularization.

The belt dehydrator 42 preliminarily treats the sludge to remove part of the water content so that the water content of sludge is reduced from 99% to 80% or even lower. The hot gas generating device 43 can generate a hot gas medium, which can be air or nitrogen. A large number of practices prove that the heating temperature of the hot gas medium ranges from 60° C. to 90° C. A plurality of first cyclone separators 44 connected in series refer to: along the sludge flow direction, the first underflow port 443 of the first cyclone separator 44 arranged first in line is connected to the first feed pipe 442 of the first cyclone separator 44 arranged second in line, the first underflow port 443 of the first cyclone separator 44 arranged second in line is connected to the first feed pipe 442 of the first cyclone separator 44 arranged third in line, and so on, until the first underflow port 443 of the penultimate first cyclone separator 44 is connected to the first feed pipe 442 of the last first cyclone separator 44. Extensive practices show that when the sludge solids rotate in the high-speed cyclone field at 20,000 r/min to 60,000 r/min, the sludge treatment system can only be provided with two first cyclone separators 44 connected in series to reduce the water content of the sludge below 20%. To further reduce the water content of sludge, a separation column 46 is provided in the present invention, the first underflow port 443 of the first cyclone separator 44 arranged first in line is connected to the feed port of the separation column 46 along the sludge flow direction, and the discharge port of the separation column 46 is connected to the first feed pipe 442 of another first cyclone separator 44. After passing through the first cyclone separator 44 arranged first in line, the sludge undergoes non-phase change dehydration and drying, and the moisture content and volume of the sludge changes accordingly. After the sludge is driven by the hot gas medium into the separation column 46, a small volume of light sludge containing a small amount of moisture continues to dry in another first cyclone separator 44 along with the hot gas medium in the separation column 46, while large sludge still containing more moisture will sinks in the separation column 46 because of its heavy volume and is treated by other methods. The separation column 46 completes the separation of the sludge to ensure the final sludge drying effect.

The invention claimed is:

1. A domestic sewage treatment system, comprising a primary treatment system, a secondary treatment system, and a sludge treatment system, wherein:

the primary treatment system comprises a coarse screen assembly, a fine screen assembly connected in sequence, the secondary treatment system comprises a biochemical tank, a clarifier connected in sequence, and the biochemical tank is connected to the primary treatment system, and wherein the primary treatment system further comprises a first hydrocyclone intensified filtration, a collector, a shape coalescer, an oil storage tank, the fine screen assembly is connected to the first hydrocyclone intensified filtration, the first hydrocyclone intensified filtration is connected to the shape coalescer, the collector, and the oil storage tank is connected to the shape coalescer;

the secondary treatment system further comprises a second cyclone separator, a power pump, the second cyclone separator comprises a second body, a second feed pipe arranged at one side thereof, a second underflow port is arranged at one side of the second body, a second overflow port is arranged at the other side thereof, one end of the power pump is connected to a sludge outlet of the clarifier through a pipe, the other end thereof is connected to the second feed pipe of the second cyclone separator, the second underflow port is connected to the biochemical tank through a pipe, and the second overflow port is connected to the sludge treatment system through a pipe;

the domestic sewage treatment system further comprises an advanced treatment system, which is connected to the secondary treatment system and the sludge treatment system, the advanced treatment system comprises a second hydrocyclone intensified filtration with a same structure as the first hydrocyclone intensified filtration, a nanofiltration device, and both the clarifier and the nanofiltration device are connected to the second hydrocyclone intensified filtration;

the sludge treatment system comprises a sludge storage tank, a belt dehydrator, a hot gas generating device, a gas-liquid separator, two first cyclone separators connected in series, the sludge storage tank is connected to the secondary treatment system, and the belt dehydrator, one of the two first cyclone separators comprises a first body, a first feed pipe vertically arranged at one side of the first body, a first underflow port is arranged at the bottom of the first body, a first overflow port is arranged at the top thereof, both the hot gas generating device, and the belt dehydrator are connected to the first feed pipe of the one of the two first cyclone separators arranged first in line along a sludge flow direction, and the first overflow ports and a first overflow port of the other of the two first cyclone separators are connected to the gas-liquid separator; and the sludge treatment system further comprises a separation column, the first underflow port of the one of the two first cyclone separators arranged first in line along the sludge flow direction is connected to the feed port of the separation column, and the discharge port of the separation column is connected to the first feed pipe of the other of the two first cyclone separators.

2. The domestic sewage treatment system according to claim 1, wherein: the first hydrocyclone intensified filtration comprises a shell, a first water inlet, a first water outlet, a separation medium bed, a discharge distributor, the first water inlet is arranged at the top of the shell, the first water outlet is arranged at the bottom thereof, the separation medium bed and the discharge distributor are arranged therein, and the separation medium bed is arranged on the discharge distributor.

3. The domestic sewage treatment system according to claim 2, wherein: a first valve is arranged at the first water inlet, a second valve is arranged at the first water outlet, the first hydrocyclone intensified filtration further comprises a gas inlet, a cleaning water inlet and a cyclone three-phase separator, both the gas inlet and the cleaning water inlet are arranged at the bottom of the shell, a third valve is arranged at the gas inlet, a fourth valve is arranged at the cleaning water inlet, and the cyclone three-phase separator is arranged in the shell and positioned at the top thereof.

4. The domestic sewage treatment system according to claim 2, wherein: the shape coalescer comprises a third body, with a second water inlet, a second water outlet and a purified oil outlet arranged thereon and with a fluid homogenizer, a coarse granulation module, a fast separation module and a deep separation module arranged therein in sequence.

\* \* \* \* \*